US009390745B2

(12) United States Patent
Shimoda et al.

(10) Patent No.: US 9,390,745 B2
(45) Date of Patent: Jul. 12, 2016

(54) DATA ARCHIVE SYSTEM

(71) Applicant: Hitachi-LG Data Storage, Inc., Tokyo (JP)

(72) Inventors: Shinichi Shimoda, Tokyo (JP); Seiji Miura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/623,981

(22) Filed: Feb. 17, 2015

(65) Prior Publication Data

US 2015/0279414 A1 Oct. 1, 2015

(30) Foreign Application Priority Data

Mar. 28, 2014 (JP) .................................. 2014-067459

(51) Int. Cl.
*G11B 21/08* (2006.01)
*G11B 17/00* (2006.01)
*G11B 17/22* (2006.01)
*G11B 27/00* (2006.01)
*G11B 19/20* (2006.01)

(52) U.S. Cl.
CPC ............ *G11B 17/005* (2013.01); *G11B 17/228* (2013.01); *G11B 27/002* (2013.01); *G11B 19/209* (2013.01); *G11B 2220/2537* (2013.01); *G11B 2220/41* (2013.01)

(58) Field of Classification Search
None
See application file for complete search history.

(56) References Cited

U.S. PATENT DOCUMENTS

| 5,081,618 A * | 1/1992 | Abe ................... G11B 7/08594 369/195 |
| 6,504,798 B1 * | 1/2003 | Revis ................... G11B 7/0037 369/195 |
| 8,385,163 B2 * | 2/2013 | Goyal ................... G11B 17/221 369/30.03 |

(Continued)

FOREIGN PATENT DOCUMENTS

JP 2012-208983 A 10/2012

OTHER PUBLICATIONS

Computer translation of JP 2012-208983 (Oct. 25, 2013).*

*Primary Examiner* — Tan X Dinh
(74) *Attorney, Agent, or Firm* — Volpe and Koenig, P.C.

(57) ABSTRACT

A data archive system includes a data library apparatus and a server. The data library apparatus includes recording media having recording surfaces on both surfaces, a recording media storage unit for storing the recording media, a recording/reproducing unit for the surface for recording/reproducing the data on/from the surface of the recording media, a recording/reproducing unit for the rear surface for recording/reproducing the data on/from the rear surface, and a recording media transporting unit for transporting the recording media between the recording media storage units. The server includes a data configuration unit for allocating the data for recording on the surface and the rear surface of the recording media and a controller for controlling the data library apparatus. The data configuration unit of the server alternately allocates the recording data on the surface and the rear surface of the recording media different from each other.

8 Claims, 17 Drawing Sheets

(56) References Cited

U.S. PATENT DOCUMENTS

| | | | | | |
|---|---|---|---|---|---|
| 2001/0040857 | A1* | 11/2001 | Sugaya | ............... | G11B 17/038 720/634 |
| 2001/0055266 | A1* | 12/2001 | Suzuki | ............... | G11B 17/0407 369/200 |
| 2001/0055267 | A1* | 12/2001 | Shimizu | ............... | G11B 17/30 369/200 |
| 2004/0105356 | A1* | 6/2004 | Klein | ............... | G11B 17/28 369/30.85 |
| 2010/0299683 | A1* | 11/2010 | Chang | ............... | G11B 23/40 720/601 |
| 2012/0250476 | A1 | 10/2012 | Hayashi et al. | | |
| 2013/0223197 | A1* | 8/2013 | Usui | ............... | G11B 17/225 369/30.38 |
| 2013/0227217 | A1* | 8/2013 | Shimoda | ............... | G06F 11/1092 711/114 |
| 2013/0258826 | A1* | 10/2013 | Yamasaki | ............... | G11B 17/04 369/30.38 |

* cited by examiner

FIG. 4A

| RECORDING MEDIA ID | RECORDING SURFACE | RECORDING DATA |
|---|---|---|
| disk(1) | SURFACE | Data(1) |
|  | REAR SURFACE |  |
| disk(2) | SURFACE | Data(3) |
|  | REAR SURFACE |  |
| disk(3) | SURFACE | Data(5) |
|  | REAR SURFACE |  |
| disk(4) | SURFACE | Data(7) |
|  | REAR SURFACE |  |
| disk(5) | SURFACE | Data(9) |
|  | REAR SURFACE |  |
| disk(6) | SURFACE | Data(11) |
|  | REAR SURFACE |  |
| disk(7) | SURFACE | Data(13) |
|  | REAR SURFACE |  |
| disk(8) | SURFACE | Data(15) |
|  | REAR SURFACE |  |
| ... | ... | ... |
| disk(n/2−1) | SURFACE | Data(n−3) |
|  | REAR SURFACE |  |
| disk(n/2) | SURFACE | Data(n−1) |
|  | REAR SURFACE |  |
| disk(n/2+1) | SURFACE |  |
|  | REAR SURFACE | Data(n) |
| disk(n/2+2) | SURFACE |  |
|  | REAR SURFACE | Data(n−2) |
| ... | ... | ... |
| disk(n−2) | SURFACE |  |
|  | REAR SURFACE | Data(6) |
| disk(n−1) | SURFACE |  |
|  | REAR SURFACE | Data(4) |
| disk(n) | SURFACE |  |
|  | REAR SURFACE | Data(2) |

FIG. 4B

| RECORDING MEDIA ID | RECORDING SURFACE | RECORDING DATA |
|---|---|---|
| disk(1) | SURFACE | RECORDED |
|  | REAR SURFACE | Data(n+1) |
| disk(2) | SURFACE | RECORDED |
|  | REAR SURFACE | Data(n+3) |
| disk(3) | SURFACE | RECORDED |
|  | REAR SURFACE | Data(n+5) |
| disk(4) | SURFACE | RECORDED |
|  | REAR SURFACE | Data(n+7) |
| disk(5) | SURFACE | RECORDED |
|  | REAR SURFACE | Data(n+9) |
| disk(6) | SURFACE | RECORDED |
|  | REAR SURFACE | Data(n+11) |
| disk(7) | SURFACE | RECORDED |
|  | REAR SURFACE | Data(n+13) |
| disk(8) | SURFACE | RECORDED |
|  | REAR SURFACE | Data(n+15) |
| ... | ... | ... |
| disk(n/2−1) | SURFACE | RECORDED |
|  | REAR SURFACE | Data(2n−2) |
| disk(n/2) | SURFACE | RECORDED |
|  | REAR SURFACE | Data(2n−1) |
| disk(n/2+1) | SURFACE | Data(2n) |
|  | REAR SURFACE | RECORDED |
| disk(n/2+2) | SURFACE | Data(2n−2) |
|  | REAR SURFACE | RECORDED |
| ... | ... | ... |
| disk(n−2) | SURFACE | Data(n+6) |
|  | REAR SURFACE | RECORDED |
| disk(n−1) | SURFACE | Data(n+4) |
|  | REAR SURFACE | RECORDED |
| disk(n) | SURFACE | Data(n+2) |
|  | REAR SURFACE | RECORDED |

FIG. 8

| RECORDING MEDIA ID | RECORDING SURFACE | RECORDING DATA |
|---|---|---|
| disk(1) | SURFACE | Data(1) |
| | REAR SURFACE | |
| disk(2) | SURFACE | Data(3) |
| | REAR SURFACE | |
| disk(3) | SURFACE | Data(5) |
| | REAR SURFACE | |
| disk(4) | SURFACE | Data(7) |
| | REAR SURFACE | |
| disk(5) | SURFACE | Data(9) |
| | REAR SURFACE | |
| disk(6) | SURFACE | Data(11) |
| | REAR SURFACE | |
| disk(7) | SURFACE | Data(13) |
| | REAR SURFACE | |
| disk(8) | SURFACE | Data(15) |
| | REAR SURFACE | |
| ... | ... | ... |
| disk(n/2−1) | SURFACE | Data(n−3) |
| | REAR SURFACE | |
| disk(n/2) | SURFACE | Data(n−1) |
| | REAR SURFACE | |
| disk(n/2+1) | SURFACE | |
| | REAR SURFACE | Data(n−1) |
| disk(n/2+2) | SURFACE | |
| | REAR SURFACE | Data(n−2) |
| ... | ... | ... |
| disk(n−2) | SURFACE | |
| | REAR SURFACE | Data(5) |
| disk(n−1) | SURFACE | |
| | REAR SURFACE | Data(3) |
| disk(n) | SURFACE | |
| | REAR SURFACE | Data(1) |

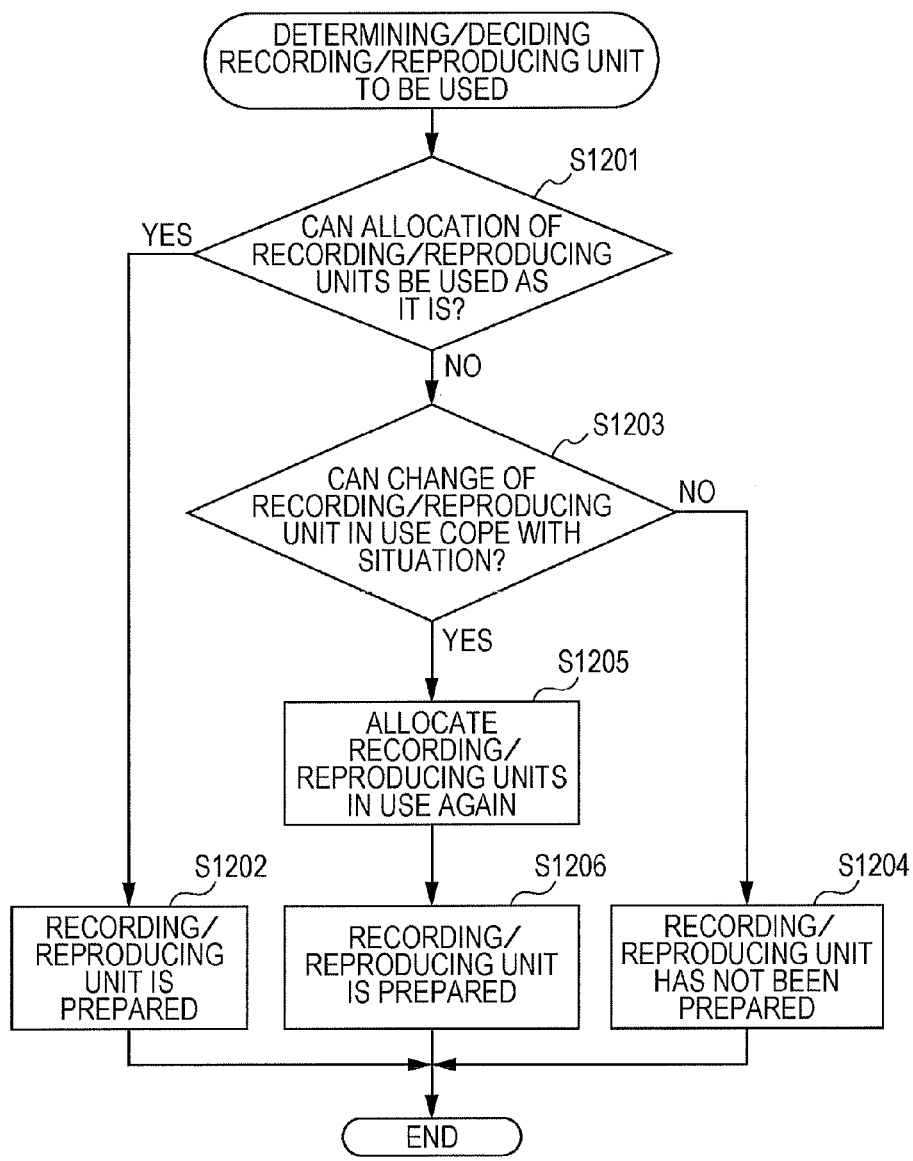

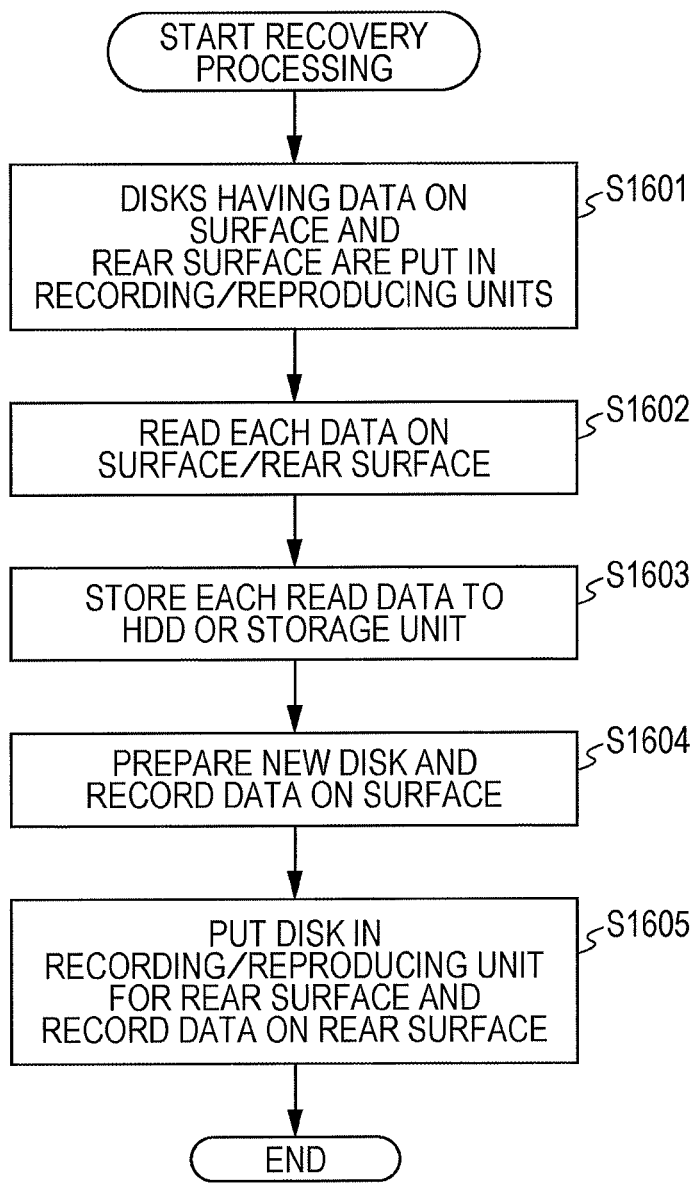

DATA ARCHIVE SYSTEM

CROSS-REFERENCE TO RELATED APPLICATIONS

This application claims the priority of Japanese Patent Application No. 2014-067459, filed on Mar. 28, 2014, which is incorporated herein by reference in its entirety.

BACKGROUND OF THE INVENTION

1. Field of the Invention

The present invention relates to a data archive system.

2. Description of the Related Art

JP-2012-208983-A is a related art of this field. As a problem, JP-2012-208983-A discloses that "When a request for reading data recorded on a under surface has been received during data recording on a surface, a recording/reproducing apparatus for storing and managing data by using an information recording disk such as an optical disk which can be recorded on both sides reads the data recorded on the under surface without waiting the completion of the data recording on the surface". Also, as a solution, JP-2012-208983-A discloses that "the recording/reproducing apparatus includes a unit for storing a plurality of optical disks, a unit for recording/reproducing the data recorded on the surface of the optical disk, a unit for recording/reproducing the data recorded on the under surface, a unit for transporting the optical disk between the unit for storing the optical disks and the unit for recording/reproducing the data, and a unit for interrupting the data recording to one surface, reproducing the data recorded on the other surface, and restarting the data recording on the surface to which the data has been recorded after the reproduction has been completed."

SUMMARY OF THE INVENTION

JP-2012-208983-A discloses the invention to perform control for interrupting data recording when the data on a rear surface is read during recoding of the data on the surface of a double-sided disc and for continuing the data recording on the surface after the data on the rear surface has been read. However, it is not considered to efficiently record/reproduce the data to the double-sided disc.

An object of the present invention is to provide a data archive system which can efficiently record/reproduce data to a double-sided disc.

A typical example of the invention disclosed in the present application is described as follows. A data archive system for recording data includes a data library apparatus configured to record the data and a server configured to control the data library apparatus. The data library apparatus includes a plurality of recording media having recording surfaces on both a surface and a rear surface, a recording media storage unit in which the recording media is stored, a recording/reproducing unit for the surface for recording/reproducing the data on/from the surface of the recording media, a recording/reproducing unit for the rear surface for recording/reproducing the data on/from the rear surface of the recording media, and a recording media transporting unit for transporting the recording media between the recording media storage unit and the recording/reproducing units. The server includes a data configuration unit for allocating the data for recording on the surface and the rear surface of the recording media of the data library apparatus and a controller for controlling the data library apparatus. The data configuration unit of the server alternately allocates the recording data on the surface and the rear surface of the recording media different from each other in the data library apparatus.

According to the present invention, the data can be efficiently recorded/reproduced to the double-sided disc in the data archive system.

Problems, structures, and effects other than the above-mentioned problem, structure, and effect will be clearly provided with reference to the description on the embodiment below.

BRIEF DESCRIPTION OF THE DRAWINGS

FIGS. 4A and 4B are diagrams of exemplary configuration methods for recording the data to the double-sided disc;

FIG. 8 is a diagram of an exemplary management table of recorded data and recording media;

FIG. 12 is a flowchart of an exemplary procedure for determining/deciding the recording/reproducing unit to be used;

FIG. 16 is a flowchart of an exemplary procedure of recovery processing of the data;

DESCRIPTION OF THE PREFERRED EMBODIMENTS

Figure 1:
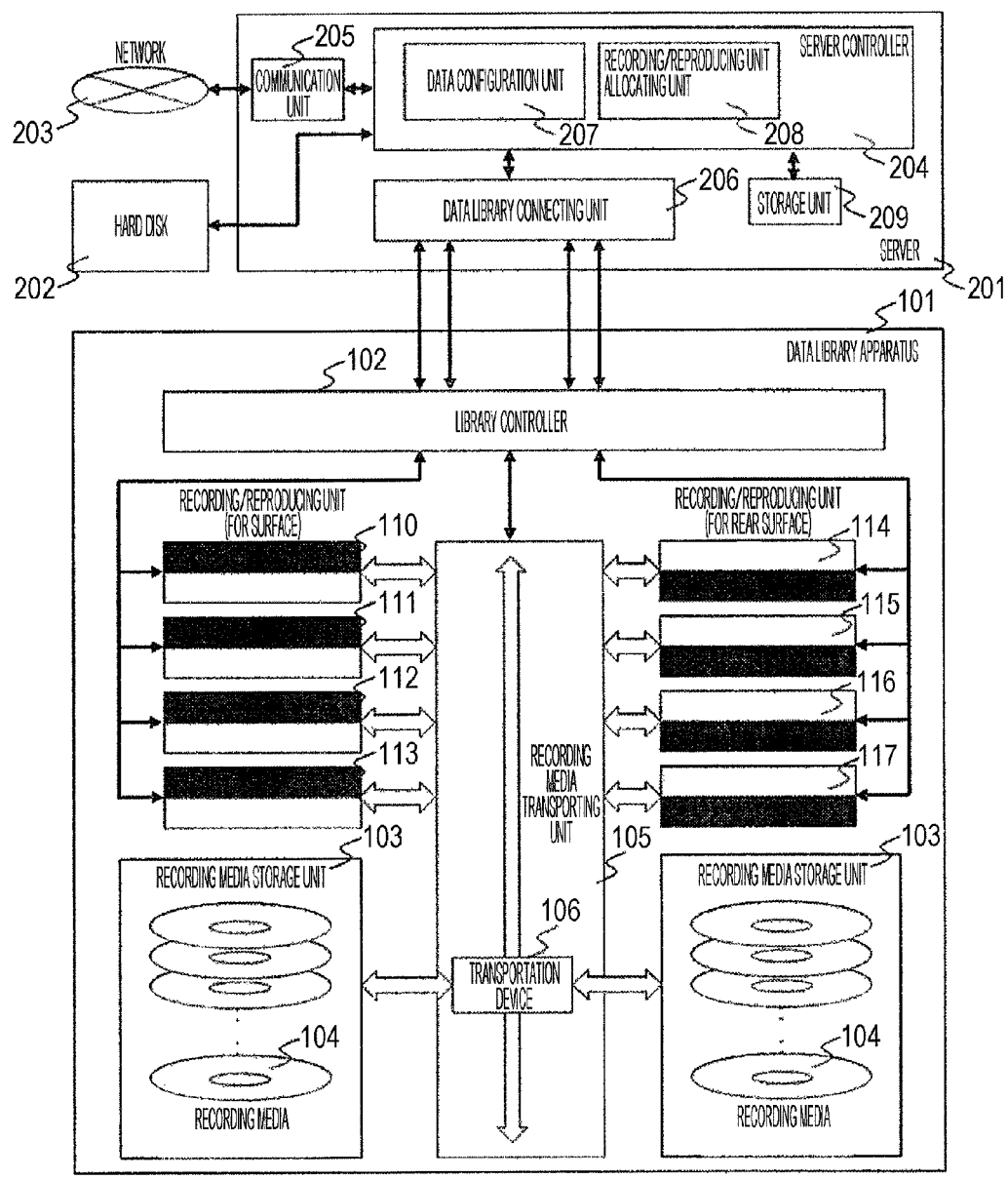
FIG. 1 is a block diagram of a structure of a data library system.

FIG. 1 is a block diagram of a structure of a data library system (data archive system). The present embodiment is an example of a data library system in which a data library apparatus performs a recording/reproducing operation to recording media by using a drive which is a plurality of data recording/reproducing units according to an instruction of a server. Especially, the present embodiment is an embodiment of a case where the data is recorded/reproduced by moving the recording media from a recording media storage unit and the data recording/reproducing unit of the data library apparatus by a recording media transporting unit.

The data library apparatus is used for data backup to protect the data recorded in the server, a disk array device, and the like or an archive to store the data for a long time and safely store the data.

Each part of FIG. 1 will be described. A server 201 provides a service which is mainly recording/reproducing the data relative to a data library apparatus 101 to be connected, and at the same time, the server 201 records and reproduces the data relative to a hard disk 202 and transmits/receives and manages the data via a network 203. Also, the hard disk 202 for storing the data may be provided in a singular or plural number. Also, a mode of the disk array device may include a plurality of hard disks.

A controller 204 of the server 201 is configured of, for example, a CPU and the like. At the time of data recording, the controller 204 controls to record the data received via a communication unit 205 from the network 203 to the hard disk 202. Also, the controller 204 controls the data library apparatus 101 via a data library connecting unit 206 and performs controls for recording the data to the recording media 104 included in the data library apparatus 101.

At the time of reproducing the data, the controller 204 performs control for reading the data from the hard disk 202 and transmitting the read data to the network 203 via the communication unit 205. Also, the controller 204 controls the data library apparatus 101 via the data library connecting unit 206 and performs control for reproducing the data from the recording media 104 included in the data library apparatus 101, receiving the reproduced data, and transmitting the received data to the network 203 via the communication unit 205. The controller 204 records and manages various information received from the data library apparatus 101 while appropriately performing processing to the information. Also, the controller 204 reproduces the information and determines a control policy based on the reproduced information, and at the same time, performs actual control.

A data configuration unit 207 in the server controller 204 of the server 201 performs processing for determining which recording media to be used from among a plurality of recording media 104 in the recording media storage unit 103 of the data library apparatus 101 and how to record the data to the recording media. The data configuration unit 207 manages/controls a disk to be used from among a plurality of double-sided discs, a side of the disk to be used, and a kind of the data to be recorded.

A recording/reproducing unit allocating unit 208 in the server controller 204 of the server 201 performs processing for determining the recording/reproducing unit to be used to record/reproduce the data from among the plurality of data recording/reproducing units 110 to 117 in the data library apparatus 101.

The server controller 204 of the server 201 takes out the recording media 104 determined by the data configuration unit 207 from the recording media storage unit 103 and puts it into a transportation device 106 of the recording media transporting unit 105 and transports the recording media 104. Then, the server controller 204 loads it to the recording/reproducing units 110 to 117 determined by the recording/reproducing unit allocating unit 208 and perform recording/reproducing the data. Conversely, the server controller 204 performs instruction control in which the recording media 104 loaded to the recording/reproducing units 110 to 117, which has terminated the recording/reproducing, is received by the transportation device 106 of the recording media transporting unit 105 and is stored in the recording media storage unit 103 by moving it.

A program to control the controller 204 of the server 201 and various information have been recorded to a storage unit 209 of the server 201.

The data library connecting unit 206 is connected to each device of the data library apparatus 101 by a connector such as a host bus adapter (HBA) and transmits an instruction from the controller 204 to the recording media transporting unit 105 and the data recording/reproducing units 110 to 117 of the data library apparatus 101.

An exemplary structure of the server 201 of the data library system has been described above.

When recording the data, the data library apparatus 101 inputs the data received from the network 203 and the data accumulated in the hard disk 202 via the server 201 and records the data to the recording media 104. When reproducing the data, the data library apparatus 101 reproduces the data from the recording media 104, transmits the data to the network 203 via the server 201, and accumulates the data in the hard disk 202.

The recording media 104 is an optical disk typified by, for example, a digital versatile disk random access memory (DVD-RAM). Also, both of a surface and a rear surface of the recording media 104 can be used to record/reproduce the data. Also, the recording media 104 may be recording media such as a magneto-optical disk and a hologram.

The plurality of recording media 104 is stored in the recording media storage unit 103. In FIG. 1, two recording media storage units 103 on the right and left are illustrated. However, the recording media storage unit 103 may be one, and three or more recording media storage units 103 may be included in the data library apparatus 101. The inside of the recording media storage unit 103 may be separated into two regions, i.e., a storage region for unrecorded recording media and a storage region for recorded recording media.

At the time of recording the data, the recording media 104 is taken out from the recording media storage unit 103 by the recording media transporting unit 105 and loaded to the recording/reproducing units 110 to 117. Then, when the data recording ends, the recording media 104 is returned to the recording media storage unit 103 by the recording media transporting unit 105. On the other hand, at the time of reproducing the data, the recording media 104 is taken out from the recording media storage unit 103 by the recording media transporting unit 105 and loaded to the recording/reproducing units 110 to 117, and then, reproduces the data. When the data reproduction ends, the recording media 104 is returned to the recording media storage unit 103 by the recording media transporting unit 105. Void arrows in FIG. 1 indicate moving paths of the recording media 104.

The recording media storage unit 103 includes position information to specify a position of the recording media 104, and the recording media transporting unit 105 specifies the recording media 104 based on the position information instructed from a library controller 102.

The recording/reproducing units 110 to 117 are controlled by the controller 102 of the data library apparatus 101 and record/reproduce the data to/from the recording media 104. When the recording media 104 is the optical disk, the recording/reproducing units 110 to 117 are optical disk drives and can record/reproduce the data to/from the optical disk. Also, in this embodiment, the recording/reproducing units 110 to 113 of the recording/reproducing units 110 to 117 are the recording/reproducing units for the surfaces, and the recording/reproducing units 114 to 117 are the recording/reproducing units for the rear surfaces. When the single recording/reproducing unit records/reproduces the data on/from both surfaces of the double-sided disc, it is necessary for the data library apparatus 101 to include a mechanism for inverting the disk. However, as indicated in the embodiment, the recordation/reproduction of the data on/from both sides of the disk is realized by including the recording/reproducing units for the surface and the rear surface. With this structure, the mechanism for inverting the disk can be removed, and a simple mechanism for moving the disk in parallel can be included. This structure contributes to miniaturize the data library apparatus 101 and reduce cost.

Eight recording/reproducing units 110 to 117 are illustrated in FIG. 1. However, the number of the recording/reproducing units may be equal to or more/less than eight, and it is preferable that two or more recording/reproducing units for both surface and rear surface be included in the archive library 101.

The recording media transporting unit 105 is controlled by the library controller 102 of the data library apparatus 101, and the recording media transporting unit 105 takes out the recording media 104 from the recording media storage unit 103, transports it, and loads it to the recording/reproducing units 110 to 117. Also, the recording media transporting unit 105 receives the recording media 104 from the recording/reproducing units 110 to 117, transports it, and stores it to the recording media storage unit 103. At this time, according to the instruction of the controller 102 of the library apparatus, when the data is recorded/reproduced on/from the surface, the recording media 104 is loaded to the recording/reproducing units (for surface) 110 to 113 so that the data can be recorded/reproduced on/from the surface. When the data is recorded/reproduced on/from the rear surface according to the instruction of the controller 102, the recording media 104 is loaded to the recording/reproducing units 114 to 117 (for rear surface) so that the data can be recorded/reproduced on/from the rear surface.

Figure 2:
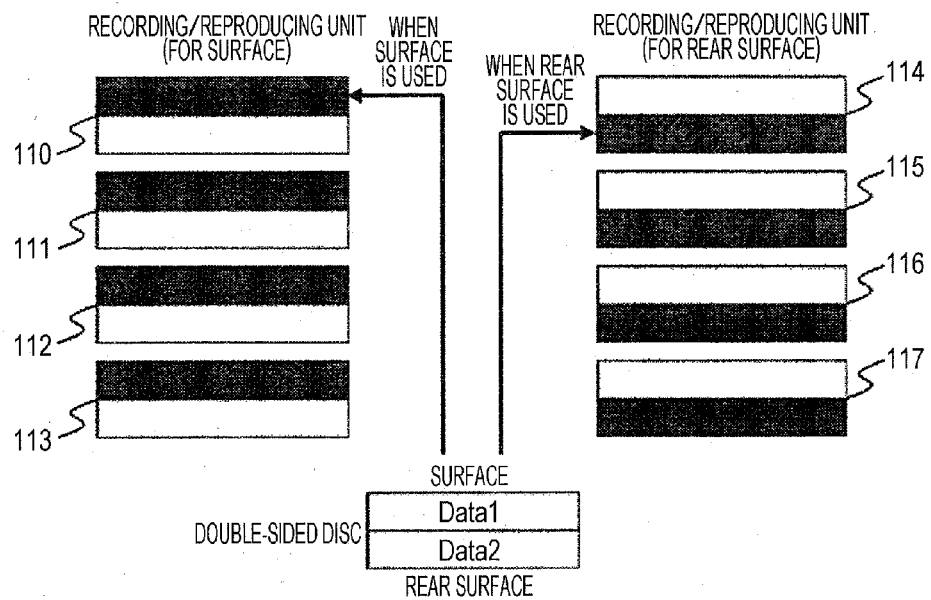
FIG. 2 is a diagram of an exemplary using method for recording/reproducing units of a data library apparatus and a double-sided disc.

FIG. 2 is a diagram for describing an exemplary using method for the recording/reproducing units (for surface/rear surface) of the data library apparatus and the double-sided disc. For example, when Data 1 on the surface is recorded/reproduced as illustrated in FIG. 2, the recording media is loaded to the recording/reproducing unit (for surface) 110. When Data 2 on the rear surface is recorded/reproduced, the recording media is loaded to the recording/reproducing unit (for rear surface) 114. Then, the recordation/reproduction of the data is realized.

According to a request from the server 201, the controller 102 of the data library apparatus 101 controls the recording media transporting unit 105, selects the desired recording media 104 from among the plurality of recording media 104 stored in the recording media storage unit 103, and sends it to the recording/reproducing units 110 to 117. Also, the controller 102 controls the recording media transporting unit 105, receives the recording media 104 from the recording/reproducing units 110 to 117, and stores the recording media in a predetermined position in the recording media storage unit 103.

An exemplary structure of the data library apparatus of the archive system has been described above.

In the archive system indicated by the embodiment as described above, processing for efficiently controlling the allocation of recording/reproducing units and the data structure which can efficiently perform processing will be described in detail below with reference to the flowchart and the like. The above processing and the data structure is regarding processing for recording the data and reproducing the data in the system for using a plurality of recording media which can be read/write from/on both sides.

FIG. 2 is a diagram for describing the exemplary using method for the recording/reproducing units (for surface/rear surface) of the data library apparatus and the double-sided disc as described above. In the archive system for using the double-sided disc of the embodiment as illustrated in FIG. 2, the recording/reproducing units for the surface and the rear surface have been determined. There is a problem such that a processing efficiency for recording/reproducing the data is reduced when switching of the disk, the allocation of the recording/reproducing units, and the like cannot be smoothly performed.

For example, when the data is recorded on the surface first and subsequently on the rear surface of the single disk according to a data structure at the time of recording the data, the disk is switched and put in the recording/reproducing unit for the rear surface and the data is recorded on the rear surface after the data has been recorded on the surface. Accordingly, this is not efficient. This problem can be solved by concurrently recording the data to two disks. However, for example, when many recording/reproducing units for the surface are used, a balance for using the recording/reproducing units for the surface and the rear surface is deteriorated. There is a possibility that an efficiency of recording/reproducing processing by the other user is reduced. For example, when all the recording/reproducing units for the surface are used to record the data, there is no recording/reproducing unit (for surface) to reproduce the data in a case where the other user attempts to reproduce the data recorded on the surface of the other disk. Therefore, the data cannot be reproduced. That is, it is necessary to use the recording/reproducing units for the surface/rear surface with good balance and make an empty recording/reproducing unit so that the other user may use both recording/reproducing units for the surface/rear surface.

Figure 3:
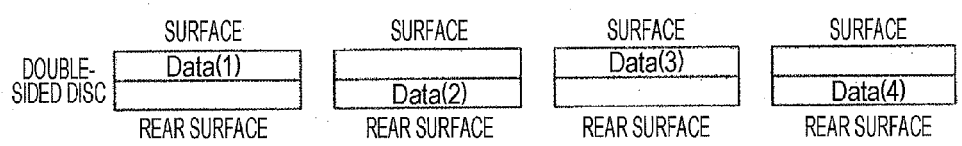
FIG. 3 is a diagram of an exemplary configuration method for recording data to the double-sided disc.

FIG. 3 is diagram of an exemplary configuration method for recording the data to the double-sided disc. As illustrated in FIG. 3, the data is alternately recorded on the surface and the rear surface of the plurality of disks with good balance, for example, surface (Data (1))→rear surface of the other disk (Data (2))→surface of the other (Data (3))→ . . . . The recording/reproducing apparatuses for the surface and the rear surface are used in good balance by configuring the data on the double-sided discs in this way. Then, the recording/reproducing apparatuses for the surface and the rear surface, which can be used, can be allowed to be empty in good balance, and a possibility is reduced that the recording/reproducing apparatus cannot be allocated for next reproducing processing and the like. Accordingly, the efficiency for recording/reproducing the data can be improved.

Also, the relation of the data becomes stronger as the points of times when the data have been recorded are closer. Since the data with strong relation has higher possibility to be concurrently accessed at the time of the reproduction, the relation becomes weaker when the times of recording the data on the surface and the rear surface of the same double-sided disc are apart from each other. At the same time, the possibility to be concurrently accessed can be reduced.

FIGS. 4A and 4B are diagrams of exemplary configuration methods, which reduces a possibility that the data is concurrently accessed, for recording the data to the double-sided disc. As illustrated in FIGS. 4A and 4B, the relation between the surface data and the rear surface data of the single double-sided disc can be reduced by adjusting the data structure of the double-sided discs of n sheets. Accordingly, a possibility can be reduced that the data on the surface and the data on the rear surface are concurrently accessed.

With reference to FIGS. 4A and 4B, the double-sided discs of n sheets are divided into two groups, i.e., a group of recording media IDs (1 to n/2−1) and a group of recording media IDs (n/2 to n), as illustrated in FIG. 4A. First, the data is recorded on the surfaces of the recording media IDs (1 to n/2−1), and the data is recorded on the rear surfaces of the recording media IDs (n/2 to n) in a reverse order of ID numbers. The data to be recorded is recorded as follows, for example, Data (1) is recorded on a surface (recording media ID (1)), Data (2) is recorded on a rear surface of the other disk (recording media ID (n)), Data (3) is recorded on a surface of the other disk (recording media ID (2)), next data is recorded on a rear surface of the other disk recording media ID (n−1)), and the like.

When all the disks of n sheets have been recorded on one surface, the data is recorded on a rear surface of the recording media ID (1 to n/2−1) as illustrated in FIG. 4B next. The data is recorded on a surface of the recording media ID (n/2 to n) in a reverse order of the ID numbers. The data to be recorded is recorded as follows, for example, Data (n+1) is recorded on a rear surface (recording media ID (1)), Data (n+2) is recorded on a surface of the other disk (recording media ID (n)), Data (n+3) is recorded on a rear surface of the other disk (recording media ID (2)), next data is recorded on a surface of the other disk (recording media ID (n−1)), and the like.

With the above data structure of the double-sided disc, the surfaces and the rear surfaces of all the disks are alternately used, and the relation between the data on the surface and the rear surface of each disk is reduced. Accordingly, the possibility that the data on the surface and the data on the rear surface are concurrently accessed can be reduced, and the efficiency for recording/reproducing the data can be improved.

In this way, a possibility can be reduced that the data on the rear surface is read when the data is written on the surface as disclosed in JP-2012-208983-A.

In addition, the efficiency for recording/reproducing the data can be improved by determining the recording/reproducing unit to be used to record/reproduce according to the use situation of the recording/reproducing units.

First, a procedure for recording/reproducing the data will be described.

Figure 5:
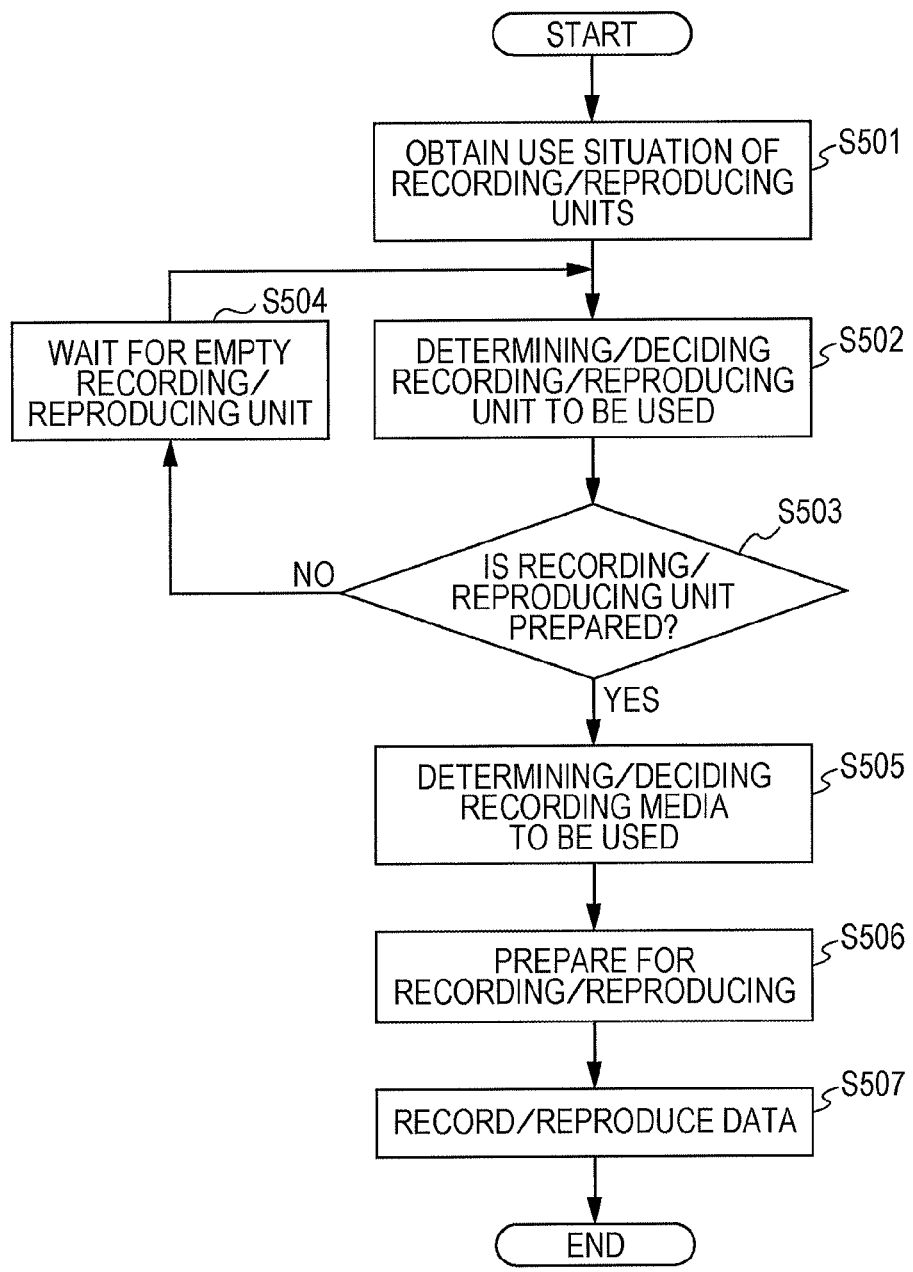
FIG. 5 is a flowchart of processing for recording/reproducing the data.

FIG. 5 is a flowchart of the processing for recording/reproducing the data. When the recordation/reproduction of the data is started, the server controller 204 of the server 201 obtains the use situation of the recording/reproducing units (step S501 (referred to as "S501" below)). Information about the use situation may be obtained by inquiring with the data library apparatus 101 and may be previously held because the server controller 204 issues the instruction to the recording/reproducing units. Also, the information may be held by the storage unit 209. The use situation indicates the use situation of the recording/reproducing units such as which recording/reproducing unit is empty and can be used from among all the recording/reproducing units, which recording/reproducing unit is recording/reproducing the data, and which recording/reproducing units are recording/reproducing the related data. After that, the recording/reproducing unit allocating unit 208 determines the recording/reproducing unit to be used (S502). It is determined whether there is an empty recording/reproducing unit (S503). When the recording/reproducing unit is not prepared, it is determined that there is no empty recording/reproducing unit and the empty recording/reproducing unit is waited (S504). Then, the processing is started after the recording/reproducing unit is prepared. When the recording/reproducing unit is prepared (S503), the data configuration unit 207 selects and determines the recording media to be used (S505). The server controller 204 instructs the data library apparatus 101 to transport the determined recording media to the determined recording/reproducing unit, and preparation for recording/reproducing is performed (S506). The recording/reproducing unit in the data library apparatus 101 records/reproduces the data (S507).

When a method for alternately using the surface and the rear surface is combined with a method for determining the recording/reproducing unit to be used according to the use situation of the recording/reproducing units, the use of the recording/reproducing units with good balance can be realized. The efficiency for recording/reproducing the data can be improved.

Figure 6:
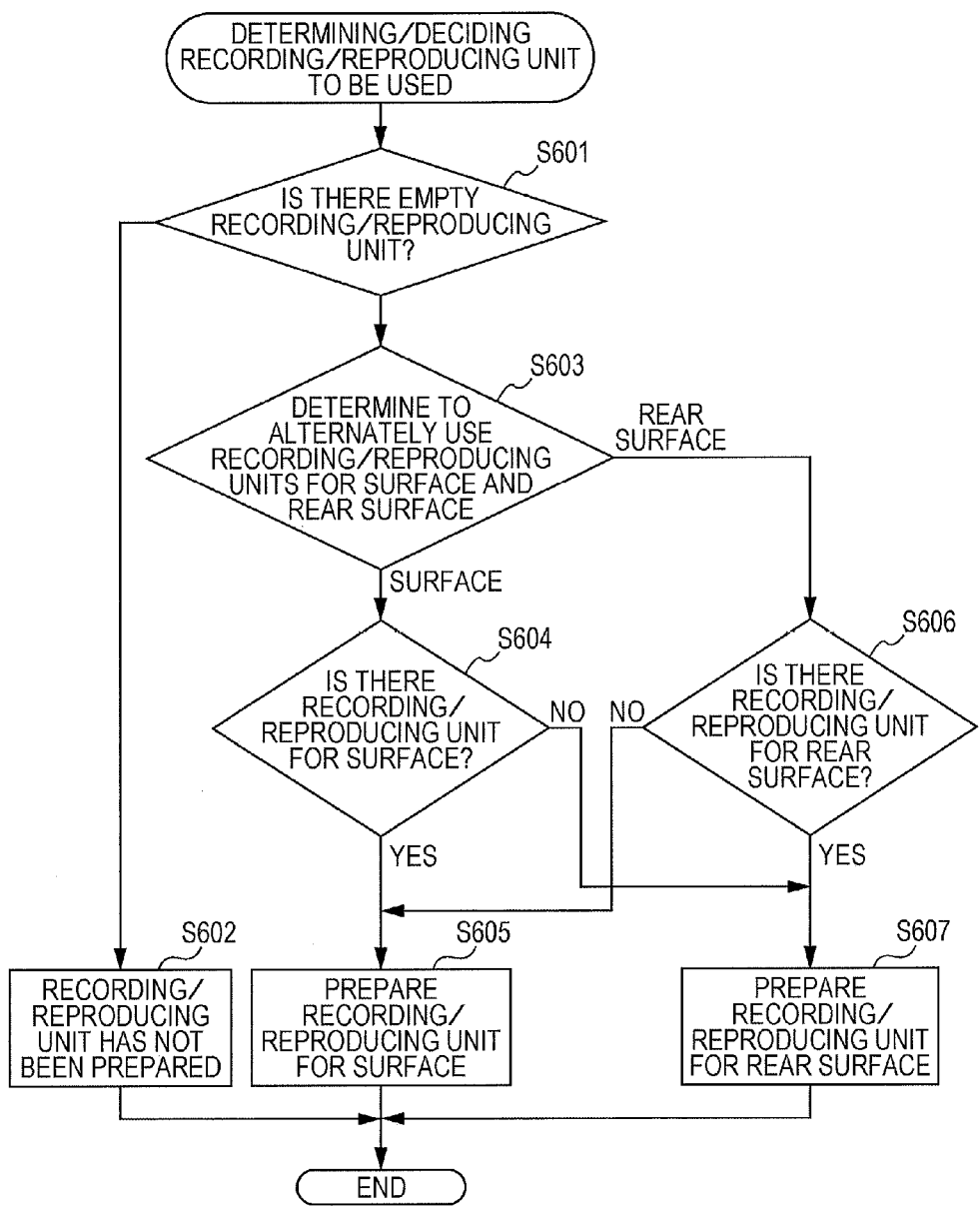
FIG. 6 is a flowchart of an exemplary procedure for determining/deciding the recording/reproducing unit to be used.

FIG. 6 is an exemplary detailed procedure of the processing for "determining/deciding the recording/reproducing unit to be used" (S502) of the flowchart in FIG. 5. The procedure will be described. First, it is determined whether there is an empty recording/reproducing unit in the recording/reproducing units of the data library apparatus 101 (S601). When there is no empty recording/reproducing unit, it is assumed that the recording/reproducing unit be not prepared (S602), and the procedure ends. When there is the empty recording/reproducing unit, the surface and the rear surface of the recording/reproducing unit to be used are alternately selected as described above (S603).

When the surface has been selected, it is determined whether there is an empty recording/reproducing unit for the surface (S604). When there is the empty recording/reproducing unit for the surface, the empty recording/reproducing unit for the surface is selected (S605), and the procedure ends. When the surface has been selected and there is no empty recording/reproducing unit for the surface (S604), the recording/reproducing unit for the rear surface is selected because the recording/reproducing unit for the rear surface is empty (S607). Then, the procedure ends.

When the rear surface has been selected, it is determined whether there is an empty recording/reproducing unit for the rear surface (S606). When there is the empty recording/reproducing unit for the rear surface, the empty recording/reproducing unit for the rear surface is selected (S607), and the procedure ends. When the rear surface has been selected and there is no empty recording/reproducing unit for the rear surface (S606), the recording/reproducing unit for the surface is selected because the recording/reproducing unit for the surface is empty (S605). Then, the procedure ends.

As described above, the use of the recording/reproducing units can be controlled with good balance, and the efficiency for recording/reproducing the data can be improved. When the numbers of the respective empty recording/reproducing units for the surface and the rear surface can be controlled to be the same as possible, the allocation of the recording/reproducing unit to be used next can be smoothly performed. Accordingly, the efficiency for recording/reproducing the data can be improved.

In order to sufficiently cope with a situation where the data on the rear surface is read when the data is written on the surface, there is a method for improving the efficiency for recording/reproducing the data by duplicating the data and improving the data structure. The method will be described below.

When the data is duplicated, source data and replica data are generated as duplicated data.

Figure 7:
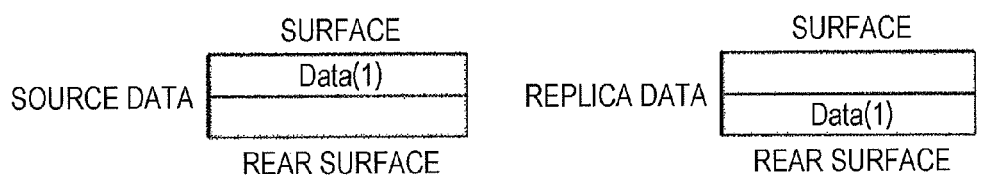
FIG. 7 is a diagram of an exemplary case where duplicated source data and replica data are recorded to the double-sided disc.

FIG. 7 is a diagram of an exemplary configuration method of a case where the duplicated source data and replica data are recorded to the double-sided disc.

For example, as illustrated in FIG. 7, control is performed in which the source data is generated on the surface of the double-sided disc and the replica data is generated on the rear surface of the other disk at the time of recording. In this way, the efficiency for recording/reproducing the data can be improved by preparing two disks, i.e., a disk for reproducing the data by the recording/reproducing unit for the surface and a disk for reproducing the data by the recording/reproducing unit for the rear surface. The control method will be described with reference to FIGS. 8 to 16.

FIG. 8 is a diagram of an exemplary management table of recorded data and recording media stored in the storage unit when the data is configured as described above. This example indicates that source data and replica data of Data (1) have been respectively recorded on a surface of a disk (1) and a rear surface of a disk (n). A place and a kind of the recorded data can be determined by referring to the table. The control will be performed by using this.

For example, the procedure at the time of the reproduction has been described with reference to FIG. 5. However, a part of the procedure will be described with reference to FIG. 9.

Figure 9:
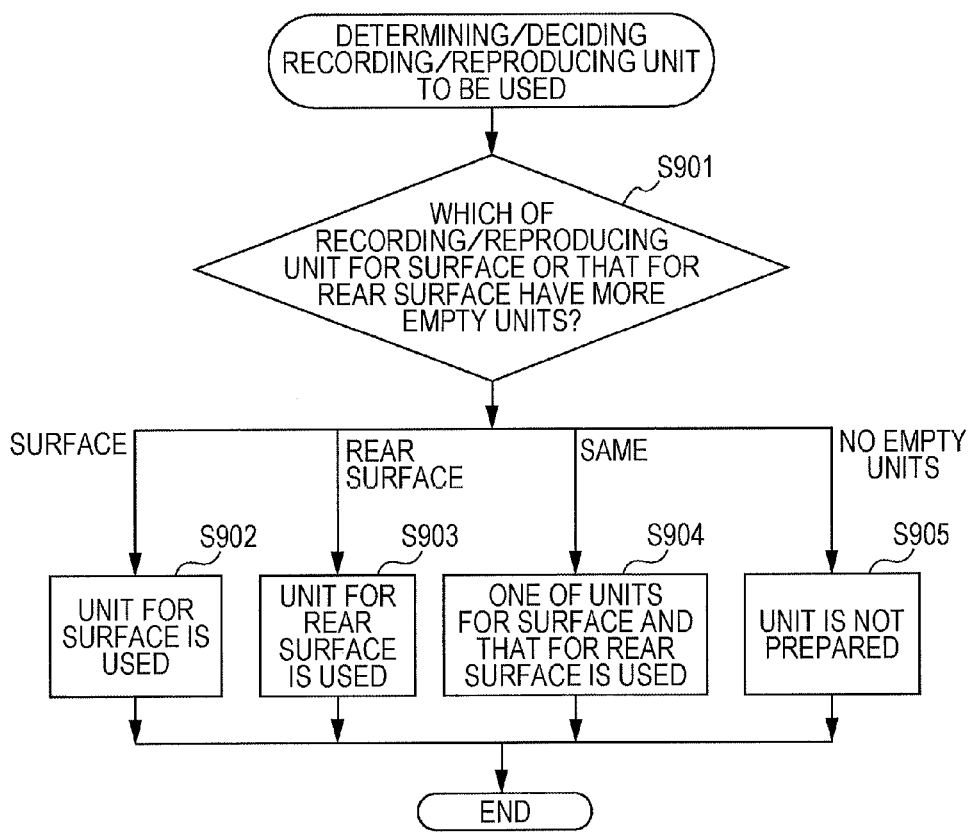
FIG. 9 is a flowchart of an exemplary procedure for determining/deciding the recording/reproducing unit to be used.

FIG. 9 is an exemplary flowchart of a detailed procedure of the processing for "determining/deciding the recording/reproducing unit to be used" (S502) of the flowchart in FIG. 5. The procedure will be described. First, it is determined which group has more empty recording/reproducing units in two groups (S901). The two groups are a group of the recording/reproducing units for the surface from among the recording/reproducing units of the data library apparatus 101 and a group of the recording/reproducing units for the rear surface. When the number of the empty recording/reproducing units for the surface is larger, the recording/reproducing unit for the surface is selected (S902). When the number of the empty recording/reproducing units for the rear surface is larger, the recording/reproducing unit for the rear surface is selected (S903). When the numbers of the empty recording/reproducing units for the surface and that for the rear surface are the same, one of them is selected (S904). When there is no empty recording/reproducing unit for the surface or the rear surface, it is determined that the recording/reproducing unit is not prepared (S905). Then, the procedure ends. With this control, when there is one empty recording/reproducing unit, the recording/reproducing unit can be used in any use situations. For example, even when all the recording/reproducing units for the surface are used, the data can be reproduced by using mirror data for the rear surface.

Figure 10A:
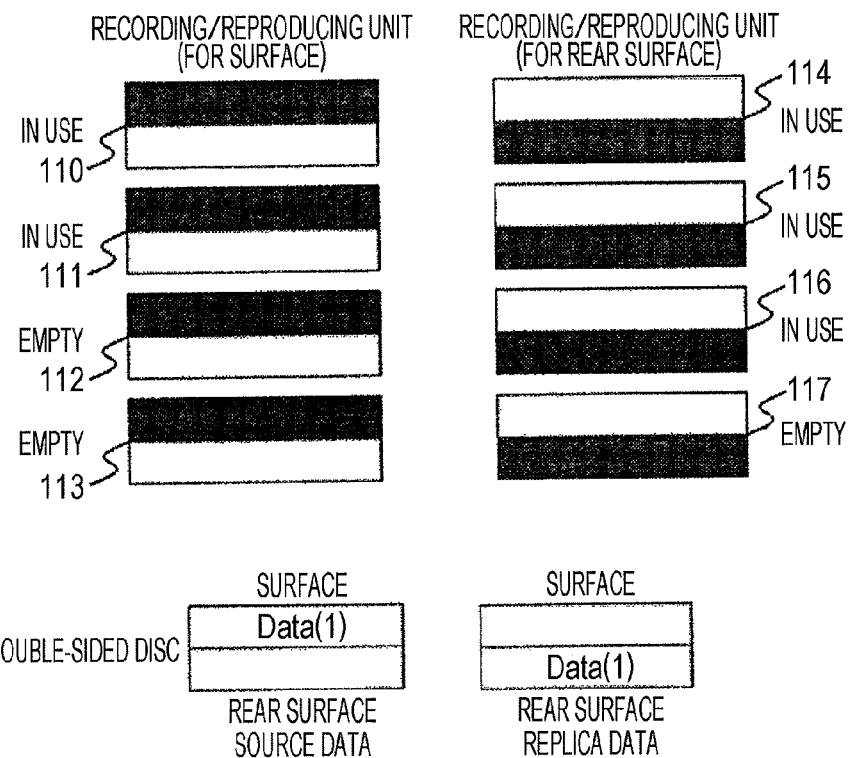
FIGS. 10A and 10B are diagrams for describing exemplary use situations of the recording/reproducing units.
Figure 10B:
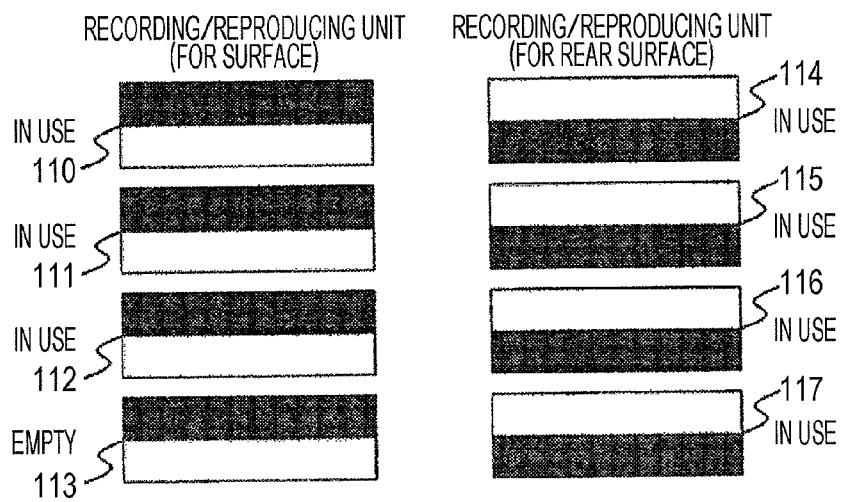

FIGS. 10A and 10B are diagrams of exemplary use situations of the recording/reproducing units of the data library apparatus 101. For example, as illustrated in FIG. 10A, the recording/reproducing units 110 and 111 are used and other two are empty from among four recording/reproducing units (for surface). On the other hand, the recording/reproducing units (for rear surface) 114 to 116 are used and one is empty from among four recording/reproducing units. At this time, for example, when Data (1) indicated in the double-sided disc illustrated on a lower side of FIG. 10A is reproduced, the empty recording/reproducing unit 112 is selected from the recording/reproducing units for the surface which have many empty units according to the flowchart in FIG. 9. The double-sided disc having the source data illustrated on the lower side of FIG. 10A is put in this recording/reproducing unit, and the data is reproduced. With this control, the recording/reproducing unit 113 for the surface and the recording/reproducing unit 117 for the rear surface are maintained to be empty so that the recording/reproducing units for both surfaces can be empty. Accordingly, when the next data is reproduced, both the data on the surface and the data on the rear surface can be reproduced. Also, when the next data is recorded, both the source data and the replica data can be respectively recorded on the surface and the rear surface.

With the above-mentioned control, the recording/reproducing units are used in good balance, and the recording/reproducing units can be previously maintained to be empty in good balance.

Also, the recording/reproducing unit may be switched in the middle according to the use situation. In FIG. 10B, a situation different from the above is considered. For example, it is assumed that Data (1) illustrated in the double-sided disc of FIG. 10B have already been reproduced by the recording/reproducing unit 117. The recording/reproducing units have been previously allocated in good balance as mentioned above. However, when the reproduction of the other data is completed earlier or continued longer, it is possible that this use situation of the recording/reproducing units become unbalanced. When next reproduction instruction is issued at this time and the data recorded on the rear surface of the disk has to be reproduced, all the recording/reproducing units for the rear surfaces are used. Therefore, the data cannot be reproduced. At this time, since Data (1) which is reproduced by the recording/reproducing unit 117 is the replica data, the disk can be switched the disk having the source data. The disk having the source data of Data (1) is put in the recording/reproducing unit 112, and the disk to reproduce Data (1) is switched to the disk having the source data. The recording/reproducing unit 117 for the rear surface is made to be empty, and data recorded on the rear surface of a disk, which is newly instructed to be reproduced, is reproduced. In this way, the allocation of the recording/reproducing units is flexibly performed in good balance according to various situations, and the recording/reproducing units can cope with various situations.

The above-mentioned method can be applied at the time of recording.

Figure 11A:
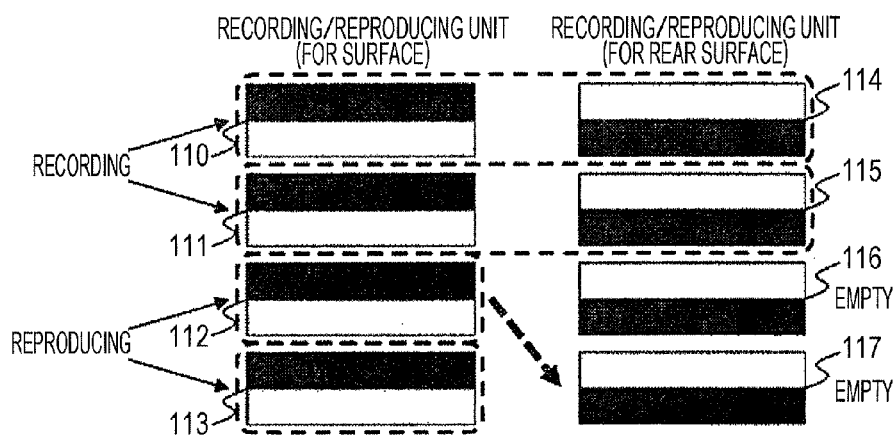
FIGS. 11A and 11B are diagrams of exemplary processing in which other reproducing data is switched and recording can be started.
Figure 11B:
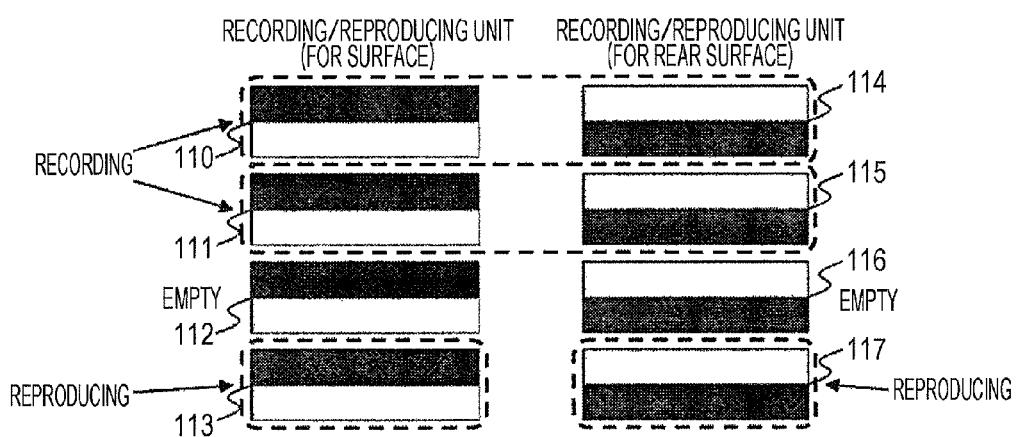

FIGS. 11A and 11B are diagrams of exemplary processing to start to record the data by switching the other reproducing data at the time of starting to the recording.

At the time of the recording, two recording/reproducing units are concurrently used, and the similar processing can be used. As illustrated in FIG. 11A, it is assumed that the recording/reproducing units 110, 111, 114, and 115 be recording the data and the recording/reproducing units 112 and 113 be reproducing the data. At this time, new data is recorded, it is necessary to use one recording/reproducing unit for the surface and one recording/reproducing unit for the rear surface to record the data. However, since there are two empty recording/reproducing units for the rear surface in the situation in FIG. 11A, the recording cannot be started. As indicated by a dotted arrow in FIG. 11A, the data reproduced by the recording/reproducing unit 112 is switched to be reproduced by the recording/reproducing unit 117. The data of the disk reproduced by the recording/reproducing unit 112 for the surface should be recorded on the rear surface of the other disk. Therefore, the disk is reproduced by the recording/reproducing unit 117 instead of the disk which has been reproduce by the recording/reproducing unit 112, and the disk reproduced by the recording/reproducing unit 112 is taken out from the recording/reproducing unit 112 so that the recording/reproducing unit 112 becomes empty. Then, the situation becomes that in FIG. 11B. The recording/reproducing units 112 and 116 which are empty in FIG. 11B are allocated to the processing of the data to be newly recorded so that the data can be recorded.

There is the procedure for previously using the recording/reproducing units in good balance illustrated in FIGS. 5 and 6. Other than this, as described with reference to FIGS. 11A and 11B, the data can be efficiently recorded/reproduced by revising the processing allocation of the recording/reproducing units when the data is recorded/reproduced. This procedure is illustrated in the flowchart in FIG. 12.

FIG. 12 is an exemplary flowchart of a detailed procedure of the processing for "determining/deciding the recording/reproducing unit to be used" (S502) of the flowchart in FIG. 5. The procedure will be described. First, at the time of recording, it is determined whether the allocation of the recording/reproducing units of the data library apparatus 101 can be used as it is (S1201). When the allocation can be used, the recording/reproducing unit is prepared. Then, it is assumed that the preparation be OK, and the procedure ends (S1202). When the allocation of the recording/reproducing units does not work well as it is, it is determined whether the change of the recording/reproducing units in use can cope with the situation (S1203). The change of the recording/reproducing units is, for example, that the reproduced disk is changed and a desired recording/reproducing unit becomes empty as described above. When the allocation cannot work by the change of the recording/reproducing units, it is assumed that the recording/reproducing unit be not prepared, and the procedure ends (S1204). When the allocation can work, as illustrated in FIG. 11 described above, the recording/reproducing units in use are allocated again (S1205). Then, the recording/reproducing unit is prepared, and it is assumed that the preparation be OK, and the procedure ends (S1206).

As described above, the control is performed in which the recording/reproducing units for the surface and the rear surface are flexibly allocated so as to be used in good balance according to various use situations, and the data can be efficiently recorded/reproduced.

In addition, there is a method for improving the efficiency and certainty of the reproduction by using two disks for the source data and the replica data. The method will be described with reference to FIGS. 13 to 14C.

Figure 13:
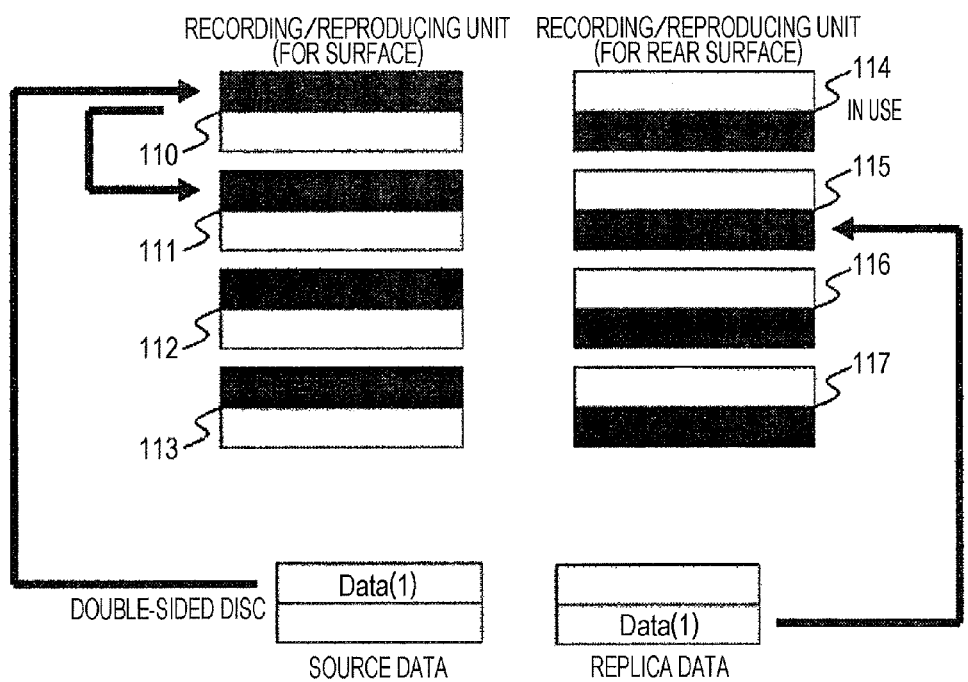
FIG. 13 is a diagram of an exemplary method for coping with a case where a failure to reproduce the data has occurred.

FIG. 13 is a diagram of a method for coping with a case where a failure to reproduce the data has occurred.

FIG. 14 is a flowchart of the procedures for coping with a case where the failure to reproduce the data has occurred.

Figure 14C:
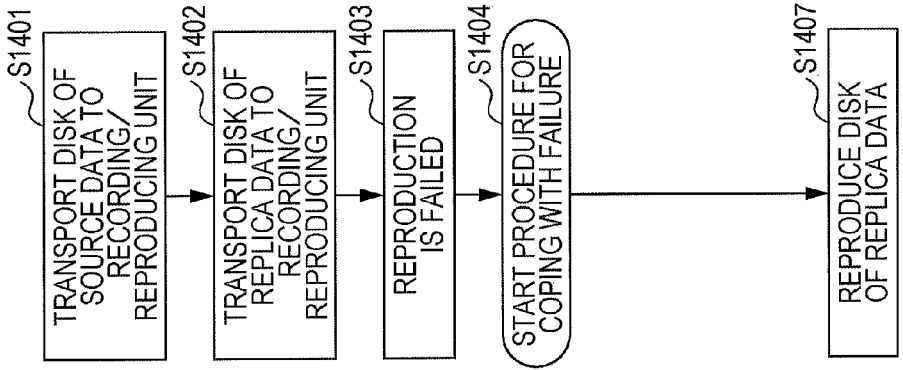
FIGS. 14A to 14C are flowcharts of exemplary procedures for coping with a case where the failure to reproduce the data has occurred.
Figure 14B:
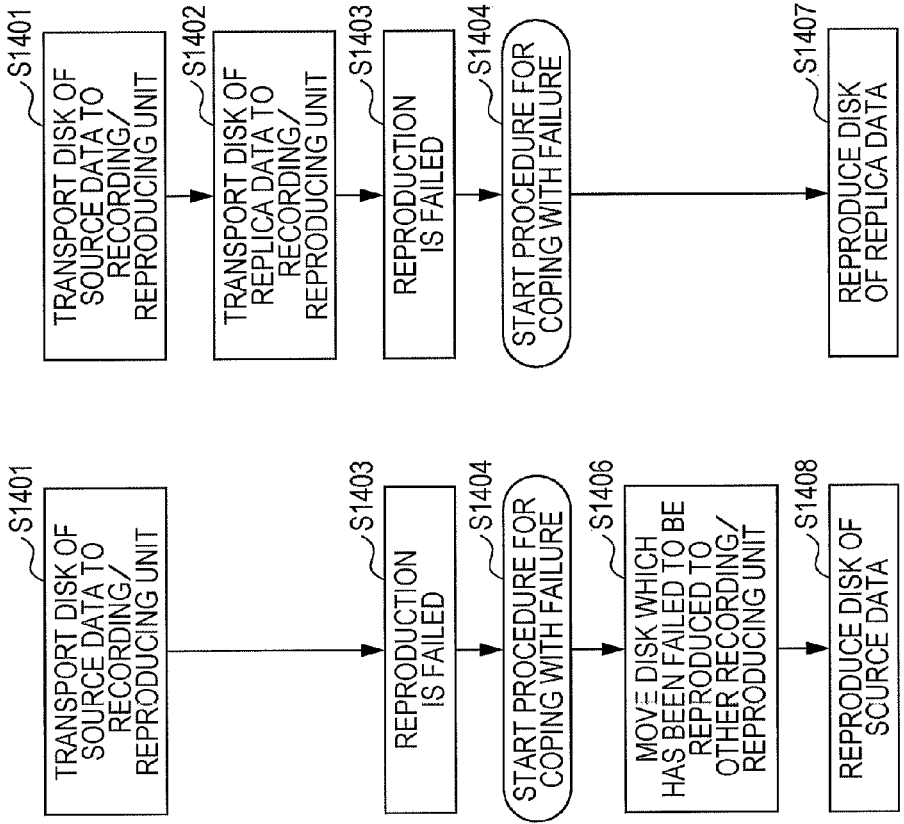
Figure 14A:
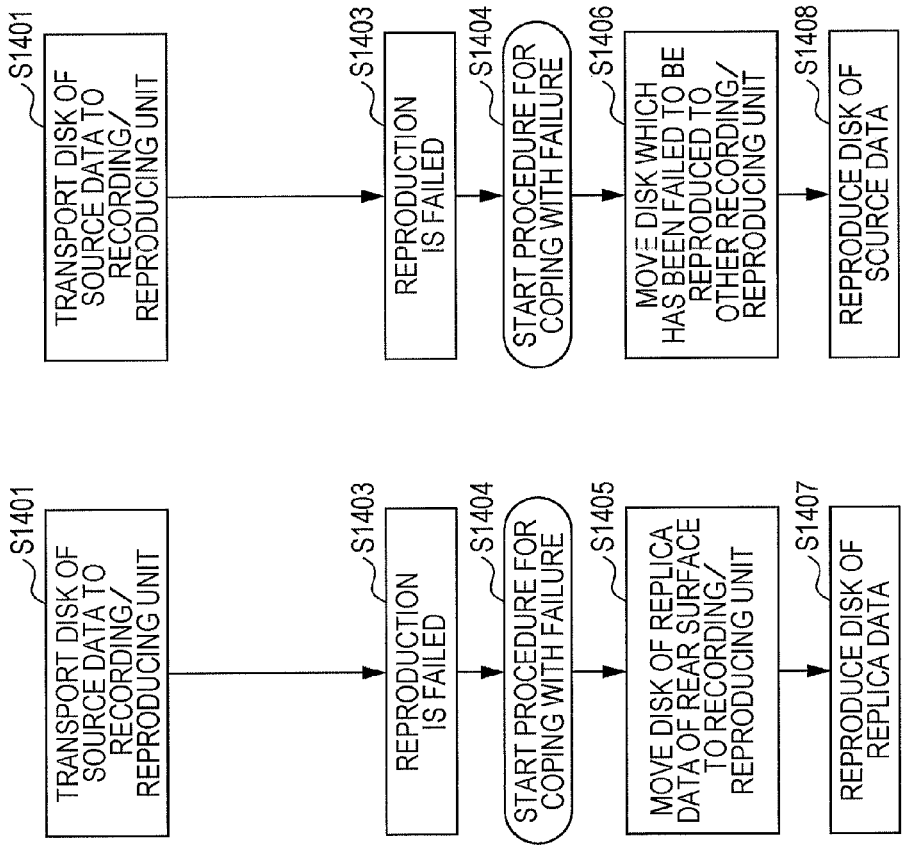

First, the procedure is illustrated in FIG. 14A in which the recording/reproducing unit 110 fails to reproduce the disk of the source data of Data (1) in FIG. 13, and instead of that, the recording/reproducing unit 115 reproduces the disk of the replica data of Data (1). The disk of the source data of Data (1) is transported to the recording/reproducing unit (S1401), and the recording/reproducing unit tries to reproduce it. At this time, it is assumed that the reproduction do not work well and be failed (S1402). When the procedure for coping with the failure of the reproduction starts from this point of time after the failure has occurred (S1404), the data can be reproduced with higher certainty by transporting the disk of the replica data of Data (1) to the recording/reproducing unit (S1405) and reproducing the disk of the replica data.

In addition, a method below can be considered. As illustrated in FIG. 14B, the disk of the source data of Data (1) is transported to the recording/reproducing unit (S1401). In the procedure (S1404) after the reproduction has been failed (S1403), the disk which is failed to be reproduced is moved to the other recording/reproducing unit (for example, recording/reproducing unit 111 in FIG. 13) (S1406) and the data is reproduced again (S1408). Of course, both procedures after the start of the procedure in FIGS. 14A and 14B (S1404) may be concurrently performed. By controlling the processing for coping with the situations as described above, the data can be more certainly reproduced.

Also, as illustrated in FIG. 14C, the processing with higher certainty and reproducing efficiency can be performed by previously preparing two disks in the recording/reproducing units. The procedure will be described. The disk of the source data of Data (1) is transported to the recording/reproducing unit (S1401), and the reproducing processing is started. Immediately after that, the disk of the replica data of Data (1) is also transported to the recording/reproducing unit (S1402). When the reproduction of the source data of Data (1) is failed (S1403), in the procedure after the failure (S1404), the quick reproduction can be performed by reproducing the disk of the replica data which has been already transported to the recording/reproducing unit instead of the source data (S1407). As described above, the data library apparatus 101 can quickly cope with the failure of the reproduction.

Also, the efficiency for recording/reproducing the data can be improved by improving the arrangement of the source data and the replica data of the data recorded to the double-sided disc.

Figure 15A:
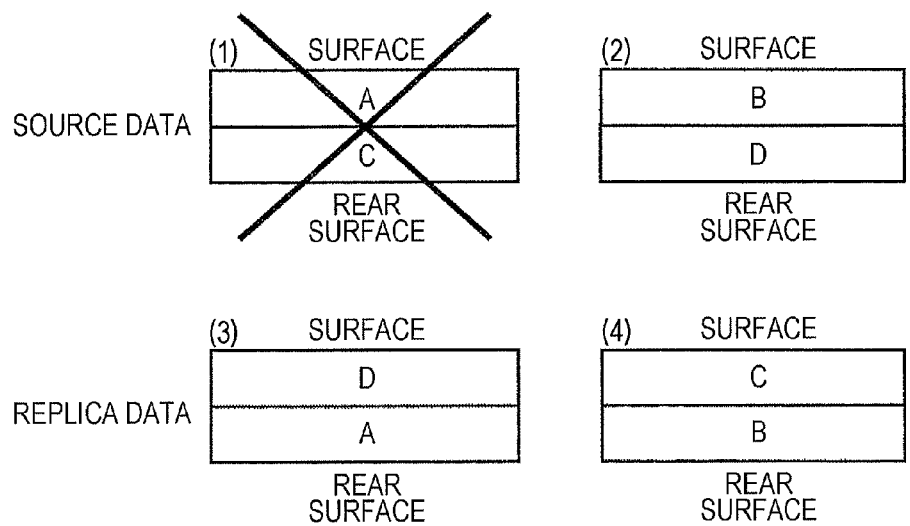
FIGS. 15A and 15B are diagrams of exemplary arrangements of the source data and the replica data.
Figure 15B:
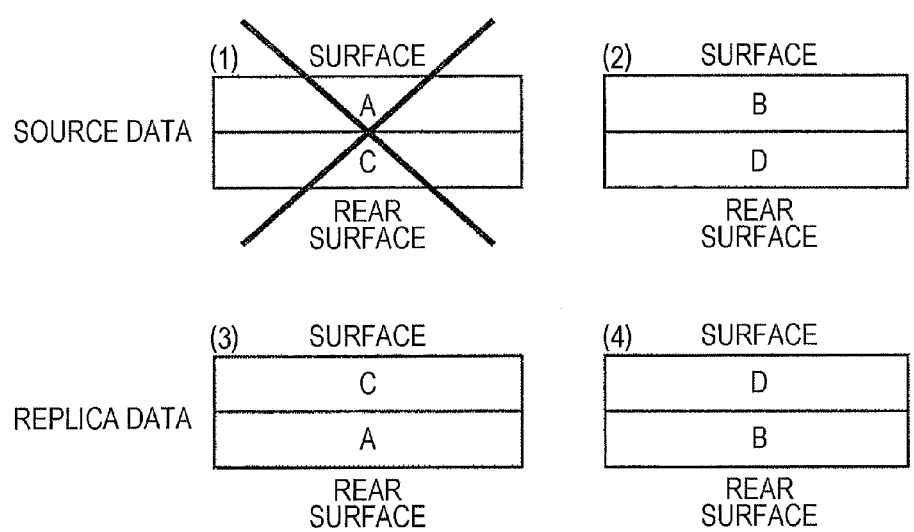

FIGS. 15A and 15B are exemplary arrangements of the source data and the replica data of the data to be recorded to the double-sided disc. In the above, the source data and the replica data are respectively recorded and arranged on the surface and the rear surface of two disks. However, in this arranging method, there is a method for improving the arrangement so as to efficiently recording/reproducing the data. As illustrated in FIG. 15A, the data of the source data and the replica data are respectively arranged on the surface and the rear surface of two disks, and in addition, combination of data on the surface and the rear surface of the disk is made different from that of another disk. In FIG. 15B, another disk (2) is created in which the arrangement of the data of the surface and the rear surface of the disk (1) is simply reversed. Compared with this method, there is a possibility to generate an effect for improving the recording/reproducing processing.

For example, in the case of FIGS. 15A and 15B and when the disk (1) is broken, it is assumed that the recovery processing be performed in which the data of this disk is recovered on other new disk. At this time, in a case of FIG. 15B, a disk (3) is used when the recovery processing is performed in which the disk (1) is recovered. However, for example, when data A is read on the disk (3), other user cannot immediately access data C. Then, there may be a case where the efficiency of the reproducing processing and the like is deteriorated. However, in a case of FIG. 15A, when the disk (1) is recovered, the other users can use disks (2) and (4) and access data B, C, and D even when the data A is read by using the disk (3). Also, the data A has already been included in the recording/reproducing unit, and accordingly, the user can access the data A. As described above; the data of the source data and the replica data are respectively arranged on the surface and the rear surface of two disks. In addition, combination of the data on the surface and the rear surface on the disk is different from that on the other disk so that the efficiency for recording/reproducing the data can be improved.

FIG. 16 is a flowchart of an exemplary procedure of recovery processing of the data of the disk.

The recovery processing of the disk will be described. First, disks having data on the surface and the rear surface are respectively transported to and put in the recording/reproducing units (S1601). For example, when the crossed data in FIG. 15A is recovered, the lower left disk is put in the recording/reproducing unit for the rear surface (for reading the data A), and the lower right disk is put in the recording/reproducing unit for the surface (for reading the data C). The respective data for the surface and the rear surface is read (S1602), and the respective data is stored in the HDD or the storage unit (S1603). A new disk for exchange is prepared, and the surface data is recorded on the surface of the recording/reproducing unit for the surface from the previously stored data (S1604). Next, the recording/reproducing unit for the rear surface records the rear surface data on the rear surface from the previously stored data (S1605). The procedure of the recovery processing has been described above. However, the data is temporarily stored in the HDD or the storage unit as illustrated in step S1603 in the procedure so that the efficiency of the processing is, improved. For example, the efficiency of reading processing can be improved by reading the respective data on the surface and the rear surface by two recording/reproducing units in parallel and storing the data in the HDD and the storage unit compared with that the data on the surface is read and recorded on the surface and the data on the rear surface is read and recorded on the rear surface.

As described above, the data is arranged by arranging the source data and the replica data on the surface and the rear surface of two disks and combining the data on the surface and the rear surface of the data differently from that of the other disk, and the selection and the operation of the using disk and the recording/reproducing unit are controlled according to the use situation and recording/reproducing state of the recording/reproducing units. Accordingly, the efficiency for recording/reproducing the data can be improved.

In addition, in a case of the RAID, the efficiency for recording/reproducing the data can be improved by improving the data structure and appropriately allocating the recording/reproducing units.

Figure 17:
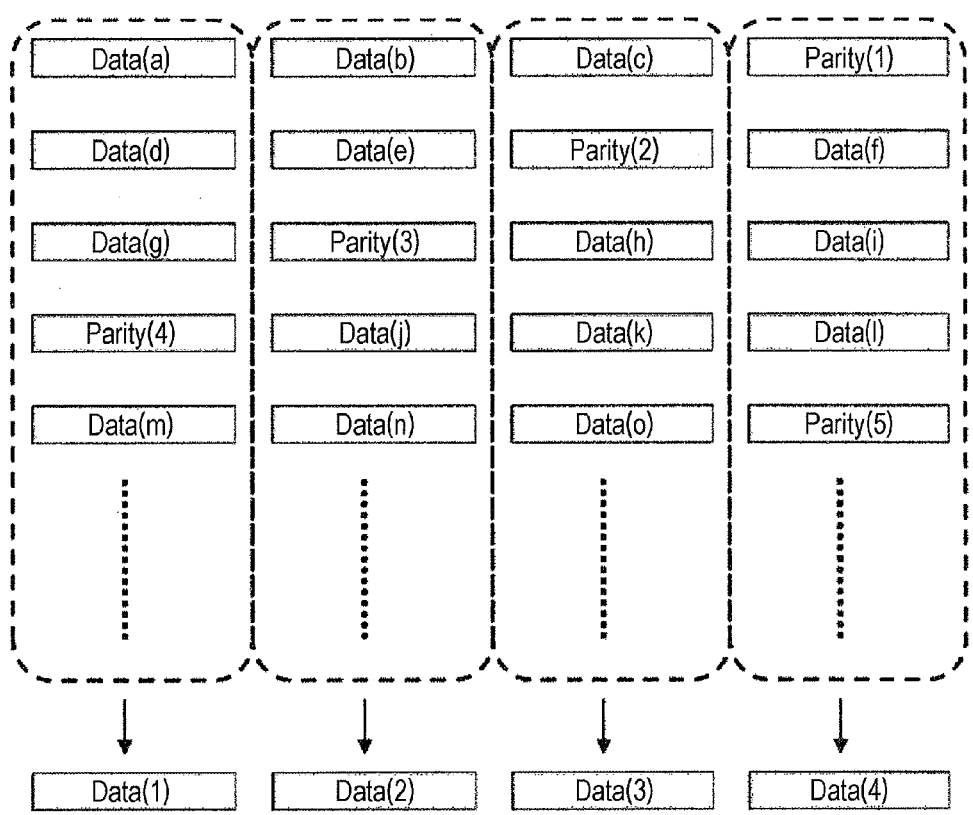
FIG. 17 is a diagram of an exemplary method for generating the data of a case where the data is recorded in a RAID method.

FIG. 17 is a diagram of an exemplary method for generating the data of a case where the data has been recorded in the RAID method.

Figure 18:
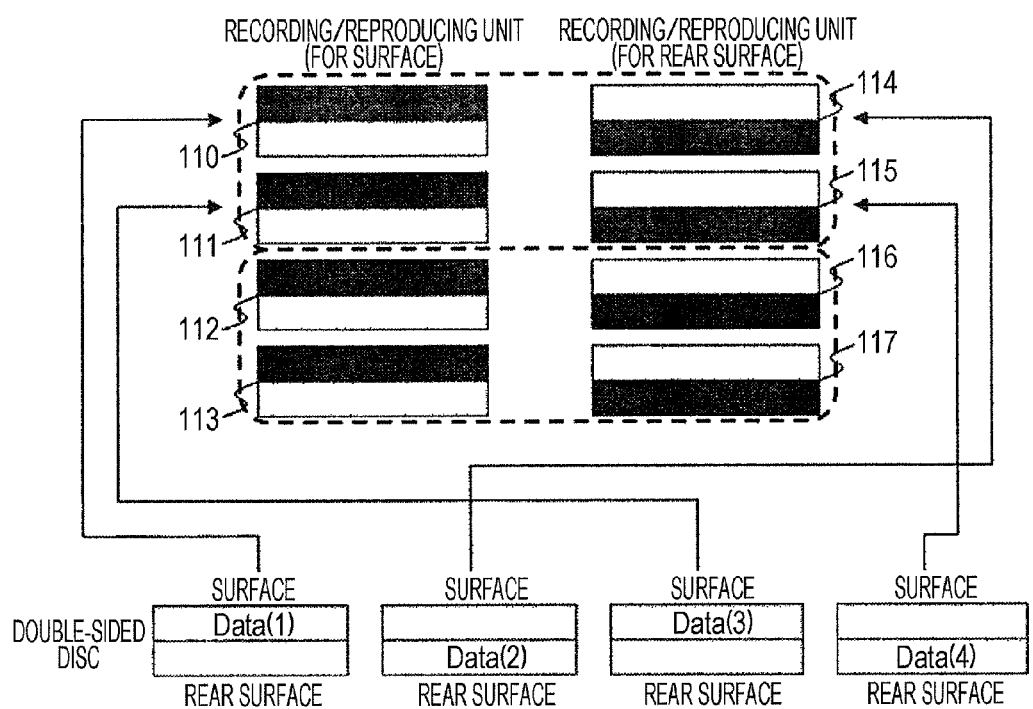
FIG. 18 is a diagram of an exemplary recording method to a disk and allocation of the recording/reproducing units of a case where the data is recorded in the RAID method.

FIG. 18 is a diagram of an exemplary recording method to the disk and allocation of the recording/reproducing units of a case where the data is recorded in the RAID method. This procedure will be described with reference to FIGS. 17 and 18.

For example, in FIG. 17, four recording/reproducing units are used and data structure is RAID5 including one data of Parity. Similarly, four recording/reproducing units can be used and RAID0 (no Parity data) and RAID6 (including two Parity data) can be used. The four recording/reproducing units are used in FIG. 17. However, the RAID data includes recording/reproducing units of even number which can be divided. For example, when there are 12 recording/reproducing units, two, four, six, and twelve are candidates of the number of the recording/reproducing units to be used in the RAID. In the example of FIG. 17, four data (Data (1) to Data (4)) included in the RAID is allocated to the recording/reproducing units. As illustrated in FIG. 18, when the data is alternately recorded on the surface and the rear surface as before, the data is recorded as follows. Data (1) is recorded by using the recording/reproducing unit 110 for the surface, and Data (2) is recorded by using the recording/reproducing unit 114 for the rear surface. Data (3) is recorded by using the recording/reproducing unit 111 for the surface, and Data (4) is recorded by using the recording/reproducing unit 115 for the rear surface. By recording the data as described above, the recording/reproducing units 112, 113, 116, and 117 for the surface and the rear surface in FIG. 18 are allowed to be empty in good balance. Accordingly, the four recording/reproducing units can record/reproduce another RAID. For example, in a case where the RAID includes four recording/reproducing units for the surface, the other RAID data for the surface cannot be reproduced when RAID data for the surface is reproduced. The recording/reproducing units for the surface and the rear surface are allowed to be empty in good balance and the recording/reproducing unit to be used next can be allowed to be empty in good balance. Accordingly the efficiency of entire recording/reproducing can be improved.

With the above control, the present invention can improve the efficiency for recording/reproducing the data. Also, for convenience of description, the recording/reproducing units have been mentioned as "for the surface" and "for the rear surface" in the present embodiment. However, the surface and the rear surface may be reversed. Similarly, the source data and the replica data may have no distinction, and also, the source data and the replica data may be reversed.

The present invention is not limited to the above-mentioned embodiment, and includes various modifications. For example, the above-mentioned embodiment is the detailed description of the present invention for easy understanding, and the present invention is not limited to the embodiment including all the components which have been described. Also, a part of the component of the embodiment can be replaced to a component of the other embodiment, and a component of the other embodiment can be added to the component of the embodiment. Also, other components can be added, deleted, switched to a part of the components of embodiment.

Also, a part of or all the components, functions, processors, processing methods, and the like mentioned above can be realized, for example, by a hardware by designing with an integrated circuit and the like. Also, the above-mentioned component, function, and the like may be realized by a software. A processor interprets a program for realizing each function and executes it so that the above-mentioned component and the like can be realized by the software. Information such as a program, table, file, and the like for realizing each function can be stored in a recording device such as a memory, a hard disk, and a solid state drive (SSD) or recording media such as an IC card, a SD card, and a DVD.

Also, a control line and an information line which are necessary for the description are illustrated, and all the control line and the information lines necessary for a product are not illustrated. It may be considered that almost all the components be actually connected to each other.

101 data library apparatus
102 library controller
103 recording media storage unit
104 recording media
105 recording media transporting unit
106 transportation device
110 to 113 recording/reproducing unit (for surface)
114 to 117 recording/reproducing unit (for rear surface)
201 server
202 hard disk
203 network
204 server controller
205 communication unit
206 data library connecting unit
207 data configuration unit
208 recording/reproducing unit allocating unit
209 storage unit

What is claimed is:
1. A data archive system for recording data, comprising:
a data library apparatus configured to record the data; and
a server configured to control the data library apparatus, wherein
the data library apparatus includes a plurality of recording media having recording surfaces on both a surface and a rear surface, a recording media storage unit in which the recording media is stored, a recording/reproducing unit for the surface for recording/reproducing the data on/from the surface of the recording media, a recording/reproducing unit for the rear surface for recording/reproducing the data on/from the rear surface of the recording media, and a recording media transporting unit for transporting the recording media between the recording media storage unit and the recording/reproducing units, the server includes a data configuration unit for allocating the data for recording on the surface and the rear surface of the recording media of the data library apparatus and a controller for controlling the data library apparatus, and the data configuration unit of the server alternately allocates the recording data on either the surface or the rear surface of the recording media, the recording media being different from each other in the data library apparatus.

2. The data archive system according to claim 1, wherein the data configuration unit of the server alternately allocates the recording data on either the rear surface or the surface which has not yet been used for recording data after one sides of the surfaces of all the recording media in the data library apparatus have been used for recording data.

3. The data archive system according to claim 1, wherein the server includes a recording/reproducing unit allocating unit for determining the recording/reproducing unit with which the data library apparatus records/reproduces the data, and the recording/reproducing unit allocating unit of the server determines the recording/reproducing unit for recording/reproducing the data according to a use situation of the recording/reproducing units for the surface and for the rear surface of the data library apparatus.

4. The data archive system according to claim 1, wherein the server includes a recording/reproducing unit allocating unit for determining the recording/reproducing unit with which the data library apparatus records/reproduces the data, the data configuration unit of the server alternately allocates recording data on either the surface or the rear surface of the recording media, the recording media being different from each other of the data library apparatus, and the recording/reproducing unit allocating unit of the server determines the recording/reproducing unit for recording/reproducing the data according to a use situation of the recording/reproducing units for the surface and for the rear surface of the data library apparatus.

5. The data archive system according to claim 1, wherein the data configuration unit of the server allocates the data so that recording data is recorded on the surface of a first recording medium and replica data which is mirror data of the recording data are recorded on rear surfaces of a second recording medium which is different from the first recording medium.

6. The data archive system according to claim 1, wherein the data configuration unit of the server allocates the data so that recording data is recorded on the surface of a first recording medium and replica data which is mirror data of the recording data are recorded on rear surface of a second recording medium which is different from the first recording medium, and the recording/reproducing unit allocating unit of the server determines the recording/reproducing unit for recording/reproducing the data according to a use situation of the recording/reproducing units for the surface and for the rear surface of the data library apparatus.

7. The data archive system according to claim 1, wherein the data configuration unit of the server allocates the data so that recording data is recorded on the surface of a first recording medium and replica data which is mirror data of the recording data are recorded on rear surfaces of a second recording medium which is different from the first recording medium, and the recording/reproducing unit allocating unit of the server switches the recording/reproducing unit for recording/reproducing the data according to a use situation of the recording/reproducing units for the surface and for the rear surface of the data library apparatus.

8. The data archive system according to claim 1, wherein the data configuration unit of the server controls to include RAID data of even number which can divide the number of the recording/reproducing units of the data library apparatus.

* * * * *